(12) United States Patent
Holmberg

(10) Patent No.: US 7,926,220 B2
(45) Date of Patent: Apr. 19, 2011

(54) STABILIZING DEVICE MOUNT AND METHOD

(76) Inventor: Larry Holmberg, Gully, MN (US)

( * ) Notice: Subject to any disclaimer, the term of this patent is extended or adjusted under 35 U.S.C. 154(b) by 0 days.

(21) Appl. No.: 12/583,339

(22) Filed: Aug. 19, 2009

(65) Prior Publication Data

US 2010/0011649 A1    Jan. 21, 2010

Related U.S. Application Data

(62) Division of application No. 11/550,127, filed on Oct. 17, 2006, now Pat. No. 7,594,352.

(51) Int. Cl.
*F41G 1/38* (2006.01)
*F41A 23/00* (2006.01)

(52) U.S. Cl. .............. 42/124; 42/111; 42/118; 42/119; 42/122; 42/146; 42/147; 42/148; 42/127; 89/37.01; 89/37.03; 89/37.04; 248/309.1

(58) Field of Classification Search .............. 42/111, 42/118, 119, 122, 130, 146, 148, 124, 147, 42/127; 89/37.01, 37.03, 37.04; 248/309.1
See application file for complete search history.

(56) References Cited

U.S. PATENT DOCUMENTS

| | | |
|---|---|---|
| 521,761 A | 6/1894 | Day |
| 547,912 A | 10/1895 | Crupe |
| 619,214 A | 2/1899 | Paul |
| 674,229 A | 5/1901 | Windle |
| 845,165 A | 2/1907 | Davis |
| 899,639 A | 9/1908 | Vibber |
| 1,452,651 A | 4/1923 | Norrlin |
| 1,480,147 A | 1/1924 | Brandt |
| 2,101,479 A | 12/1937 | Schenk |
| 2,450,466 A | 10/1948 | Carlson |
| 2,814,118 A | 11/1957 | Evans et al. |
| 3,065,666 A | 11/1962 | Sampson |
| 3,427,102 A | 2/1969 | Wade |
| 3,483,623 A * | 12/1969 | Kruzell ................... 42/127 |
| 3,684,376 A | 8/1972 | Lessard |
| 3,684,378 A | 8/1972 | Lord |
| 3,737,232 A | 6/1973 | Millburn, Jr. |

(Continued)

FOREIGN PATENT DOCUMENTS

EP    1804017 A1    7/2007

(Continued)

OTHER PUBLICATIONS

Improved Construction Methods, "Laser Measuring System, Impulse LX", http://www.improvedconstructionmethods.com/impulse_xl.htm.

(Continued)

*Primary Examiner* — Bret Hayes
*Assistant Examiner* — Michael D David
(74) *Attorney, Agent, or Firm* — Kinney & Lange, P.A.

(57) ABSTRACT

A device mount for a weapon with a stabilizing function is provided. In one embodiment, the device mount includes a device bracket, a stabilizing tube and at least one stabilizing member. The device bracket has a support plate and a side plate that extends generally at a right angle from the support plate. The stabilizing tube is movably coupled to the side plate. The at least one stabilizing member is received in the stabilizing tube. Moreover, the at least one stabilizing member is configured to stabilize motion of the device bracket.

6 Claims, 7 Drawing Sheets

U.S. PATENT DOCUMENTS

| | | | |
|---|---|---|---|
| 3,782,822 A | 1/1974 | Spence | |
| 3,785,261 A | 1/1974 | Ganteaume | |
| 3,834,052 A | 9/1974 | Steck, III | |
| 4,000,403 A | 12/1976 | Rice | |
| 4,026,054 A | 5/1977 | Snyder | |
| 4,027,414 A | 6/1977 | Felix | |
| 4,069,414 A | 1/1978 | Bell | |
| 4,223,770 A | 9/1980 | Kranz | |
| 4,233,770 A * | 11/1980 | de Filippis et al. | 42/114 |
| 4,283,743 A | 8/1981 | Kaiser | |
| T101,001 I4 | 9/1981 | Shipp et al. | |
| 4,296,725 A | 10/1981 | Broderick | |
| D268,910 S | 5/1983 | Shipp et al. | |
| 4,514,907 A | 5/1985 | Saltzman | |
| 4,516,296 A | 5/1985 | Sherman | |
| 4,531,052 A | 7/1985 | Moore | |
| 4,561,204 A | 12/1985 | Binion | |
| 4,564,322 A | 1/1986 | Stapley | |
| 4,597,211 A | 7/1986 | Miles | |
| 4,606,629 A | 8/1986 | Hines et al. | |
| 4,617,741 A | 10/1986 | Bordeaux et al. | |
| 4,640,258 A | 2/1987 | Penney et al. | |
| 4,643,159 A | 2/1987 | Ryan | |
| 4,730,190 A | 3/1988 | Win et al. | |
| 4,753,528 A | 6/1988 | Hines et al. | |
| 4,777,352 A | 10/1988 | Moore | |
| 4,786,204 A | 11/1988 | Mayeda | |
| 4,786,966 A | 11/1988 | Hanson et al. | |
| 4,827,348 A | 5/1989 | Ernest et al. | |
| 4,835,621 A | 5/1989 | Black | |
| 4,884,137 A | 11/1989 | Hanson et al. | |
| 4,890,128 A | 12/1989 | Kania | |
| 4,907,567 A | 3/1990 | Henrich | |
| 4,910,717 A | 3/1990 | Terry | |
| 4,939,863 A | 7/1990 | Alexander et al. | |
| 4,970,589 A | 11/1990 | Hanson et al. | |
| 4,974,575 A * | 12/1990 | Mitchell | 124/88 |
| D313,361 S | 1/1991 | Robinson | |
| 4,993,833 A * | 2/1991 | Lorey et al. | 356/252 |
| 4,996,866 A * | 3/1991 | Masera et al. | 72/387 |
| 5,005,213 A * | 4/1991 | Hanson et al. | 398/119 |
| 5,020,262 A * | 6/1991 | Pena | 42/106 |
| 5,026,158 A * | 6/1991 | Golubic | 356/252 |
| 5,033,219 A * | 7/1991 | Johnson et al. | 42/115 |
| 5,161,310 A * | 11/1992 | Stoot | 33/265 |
| 5,200,827 A * | 4/1993 | Hanson et al. | 348/216.1 |
| 5,262,837 A | 11/1993 | Shyy | |
| 5,265,896 A | 11/1993 | Kravitz | |
| 5,297,533 A * | 3/1994 | Cook | 124/88 |
| 5,326,061 A | 7/1994 | Hamilton | |
| 5,339,793 A | 8/1994 | Findley | |
| 5,373,657 A * | 12/1994 | Betz et al. | 42/111 |
| 5,418,609 A | 5/1995 | Dunne | |
| 5,455,625 A | 10/1995 | Englander | |
| 5,456,157 A * | 10/1995 | Lougheed et al. | 89/134 |
| 5,479,712 A * | 1/1996 | Hargrove et al. | 33/265 |
| 5,507,272 A | 4/1996 | Scantlen | |
| 5,520,164 A * | 5/1996 | Huddleston | 124/86 |
| D371,084 S | 6/1996 | Ogawa | |
| 5,531,149 A * | 7/1996 | Schubert et al. | 89/1.14 |
| 5,555,665 A | 9/1996 | Fore | |
| 5,575,072 A * | 11/1996 | Eldridge | 33/265 |
| 5,606,818 A | 3/1997 | Hardee | |
| 5,611,324 A * | 3/1997 | Kursinsky | 124/86 |
| 5,669,147 A * | 9/1997 | Nakajima et al. | 33/334 |
| 5,669,174 A * | 9/1997 | Teetzel | 42/115 |
| 5,686,690 A * | 11/1997 | Lougheed et al. | 89/41.17 |
| 5,687,910 A | 11/1997 | King | |
| 5,711,104 A * | 1/1998 | Schmitz | 42/111 |
| D390,483 S | 2/1998 | Zykan et al. | |
| 5,739,859 A | 4/1998 | Hattori et al. | |
| 5,815,251 A * | 9/1998 | Ehbets et al. | 356/5.01 |
| 5,822,621 A | 10/1998 | Szajewski | |
| 5,831,718 A * | 11/1998 | Desai et al. | 356/5.01 |
| 5,834,676 A * | 11/1998 | Elliott | 89/41.05 |
| 5,845,165 A * | 12/1998 | McMahan | 396/426 |
| 5,859,693 A * | 1/1999 | Dunne et al. | 356/4.01 |
| 5,887,375 A * | 3/1999 | Watson | 42/106 |
| 5,892,617 A * | 4/1999 | Wallace | 359/353 |
| 5,895,131 A | 4/1999 | Yano | |
| 5,911,215 A * | 6/1999 | Fisher, Jr. | 124/86 |
| 5,926,260 A * | 7/1999 | Dunne et al. | 356/5.05 |
| 5,937,562 A * | 8/1999 | Brough | 42/119 |
| 5,944,041 A * | 8/1999 | Kitchens | 135/98 |
| 5,949,529 A * | 9/1999 | Dunne et al. | 356/4.01 |
| 5,964,054 A | 10/1999 | Galfidi, Jr. | |
| 5,973,315 A * | 10/1999 | Saldana et al. | 250/214 VT |
| D421,229 S | 2/2000 | Imai | |
| 6,029,643 A * | 2/2000 | Golfieri | 124/1 |
| 6,070,355 A * | 6/2000 | Day | 42/106 |
| 6,073,352 A * | 6/2000 | Zykan et al. | 33/265 |
| D432,930 S | 10/2000 | Sanoner | |
| 6,137,564 A * | 10/2000 | Schmidt et al. | 356/4.01 |
| 6,154,971 A * | 12/2000 | Perkins | 33/265 |
| 6,192,614 B1 * | 2/2001 | Cliburn | 42/106 |
| 6,237,463 B1 * | 5/2001 | Grizzaffi | 89/41.17 |
| 6,252,706 B1 * | 6/2001 | Kaladgew | 359/399 |
| 6,269,581 B1 * | 8/2001 | Groh | 42/122 |
| 6,286,796 B1 * | 9/2001 | Pugliesi | 248/187.1 |
| 6,288,386 B1 * | 9/2001 | Bowen et al. | 250/214 VT |
| 6,296,581 B1 | 10/2001 | Sever | |
| 6,304,289 B1 | 10/2001 | Sakai et al. | |
| 6,331,887 B1 * | 12/2001 | Shiraishi et al. | 356/3.03 |
| 6,336,285 B1 * | 1/2002 | Baumer | 42/124 |
| 6,341,201 B1 | 1/2002 | Ishiguro et al. | |
| 6,396,571 B2 * | 5/2002 | Ohtomo et al. | 356/5.1 |
| 6,397,483 B1 * | 6/2002 | Perkins | 33/265 |
| 6,398,571 B1 | 6/2002 | Nishide et al. | |
| 6,408,140 B1 * | 6/2002 | Malloy Desormeaux | 396/429 |
| D460,367 S | 7/2002 | Apotheloz et al. | |
| D460,368 S * | 7/2002 | Apotheloz et al. | D10/70 |
| D460,369 S | 7/2002 | Apotheloz et al. | |
| 6,425,697 B1 * | 7/2002 | Potts et al. | 396/426 |
| 6,450,816 B1 | 9/2002 | Gerber | |
| 6,487,809 B1 | 12/2002 | Gaber | |
| 6,494,196 B2 | 12/2002 | Harwath et al. | |
| 6,526,956 B1 * | 3/2003 | Hankins | 124/86 |
| D472,826 S | 4/2003 | Sanoner | |
| 6,556,245 B1 * | 4/2003 | Holmberg | 348/333.01 |
| 6,598,331 B1 | 7/2003 | Thibodeaux | |
| 6,615,531 B1 | 9/2003 | Holmberg | |
| 6,623,182 B2 | 9/2003 | Tatera | |
| 6,624,881 B2 | 9/2003 | Waibel et al. | |
| 6,678,988 B1 * | 1/2004 | Poff, Jr. | 42/147 |
| 6,681,755 B2 | 1/2004 | Pujos | |
| 6,693,702 B2 | 2/2004 | Rogers | |
| 6,704,097 B2 | 3/2004 | Waibel et al. | |
| D488,315 S | 4/2004 | Natuzzi | |
| 6,722,076 B2 | 4/2004 | Nielsen | |
| 6,742,299 B2 * | 6/2004 | Strand | 42/134 |
| 6,772,076 B2 | 8/2004 | Yamamoto et al. | |
| 6,784,920 B2 | 8/2004 | Weber | |
| 6,796,038 B2 * | 9/2004 | Humphries | 33/265 |
| 6,813,025 B2 | 11/2004 | Edwards | |
| 6,815,251 B1 | 11/2004 | Akram et al. | |
| 6,819,495 B2 * | 11/2004 | Shani et al. | 359/630 |
| 6,819,866 B2 | 11/2004 | Da Silva | |
| 6,871,440 B2 * | 3/2005 | Highfill et al. | 42/94 |
| 6,886,287 B1 * | 5/2005 | Bell et al. | 42/120 |
| 6,886,288 B1 | 5/2005 | Yocum et al. | |
| 6,932,305 B2 * | 8/2005 | Morales et al. | 248/187.1 |
| 6,988,331 B2 | 1/2006 | Holmberg | |
| 7,006,144 B2 | 2/2006 | Holmberg | |
| 7,088,506 B2 | 8/2006 | Regan et al. | |
| 7,128,354 B2 | 10/2006 | Wu | |
| 7,143,986 B1 * | 12/2006 | Austin et al. | 248/187.1 |
| 7,269,920 B2 * | 9/2007 | Staley, III | 42/114 |
| 7,313,884 B2 * | 1/2008 | Eddins | 42/94 |
| 7,356,960 B1 * | 4/2008 | Knitt | 42/94 |
| 7,390,130 B2 | 6/2008 | Soulvie | |
| 2002/0067475 A1 | 6/2002 | Waibel et al. | 356/4.01 |
| 2002/0078577 A1 | 6/2002 | Aldred | |
| 2002/0087475 A1 | 7/2002 | Okayama et al. | |
| 2002/0109057 A1 | 8/2002 | Wooten et al. | |
| 2002/0171755 A1 * | 11/2002 | Nishimura | 348/372 |
| 2003/0013392 A1 | 1/2003 | Guillermin | |
| 2003/0133092 A1 * | 7/2003 | Rogers | 356/4.01 |

| | | | |
|---|---|---|---|
| 2003/0163943 A1* | 9/2003 | Holmberg | 42/142 |
| 2004/0000083 A1 | 1/2004 | Grant, Jr. | |
| 2004/0016169 A1 | 1/2004 | Poff, Jr. | |
| 2004/0051865 A1* | 3/2004 | Stierle et al. | 356/141.5 |
| 2004/0079018 A1* | 4/2004 | Holmberg | 42/142 |
| 2004/0114129 A1* | 6/2004 | Gogolla et al. | 356/4.01 |
| 2004/0135991 A1* | 7/2004 | Gogolla et al. | 356/4.01 |
| 2004/0183942 A1* | 9/2004 | Holmberg | 348/373 |
| 2004/0194364 A1* | 10/2004 | Holmberg | 42/114 |
| 2004/0257437 A1* | 12/2004 | Lesseu | 348/61 |
| 2005/0035245 A1 | 2/2005 | Morales et al. | |
| 2005/0123883 A1 | 6/2005 | Kennen et al. | |
| 2005/0195385 A1* | 9/2005 | Holmberg | 356/8 |
| 2005/0241210 A1* | 11/2005 | Karcher et al. | 42/119 |
| 2005/0246910 A1* | 11/2005 | Mowers | 33/266 |
| 2005/0252062 A1* | 11/2005 | Scrogin et al. | 42/119 |
| 2005/0268519 A1 | 12/2005 | Pikielny | |
| 2005/0268521 A1* | 12/2005 | Cox et al. | 42/130 |
| 2006/0010761 A1* | 1/2006 | Staley | 42/142 |
| 2006/0215149 A1 | 9/2006 | LaBelle et al. | |
| 2007/0008187 A1 | 1/2007 | Schmidt | |
| 2007/0031142 A1* | 2/2007 | Moody et al. | 396/419 |
| 2007/0068018 A1* | 3/2007 | Gilmore | 33/265 |
| 2007/0081817 A1 | 4/2007 | Soulvie | |
| 2007/0157502 A1* | 7/2007 | Holmberg | 42/124 |
| 2007/0157503 A1* | 7/2007 | Holmberg | 42/124 |
| 2007/0277421 A1* | 12/2007 | Perkins et al. | 42/122 |
| 2008/0000465 A1* | 1/2008 | Holmberg | 124/86 |
| 2008/0060248 A1* | 3/2008 | Pine et al. | 42/114 |
| 2008/0087784 A1* | 4/2008 | Holmberg | 248/309.1 |

FOREIGN PATENT DOCUMENTS

| | | |
|---|---|---|
| GB | 2024558 A | 1/1980 |
| GB | 2114770 A | 8/1983 |
| WO | WO9012330 | 10/1990 |
| WO | WO2006090356 A1 | 8/2006 |
| WO | WO2006133029 A2 | 12/2006 |

OTHER PUBLICATIONS

"Specification Sheet on the Impulse 200 LR Laser (Rangefinder)," Nov. 15, 2003, Publisher: Laser Technology Inc.

* cited by examiner

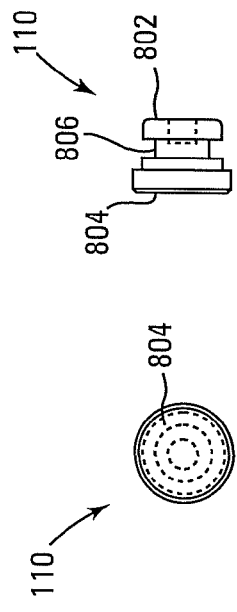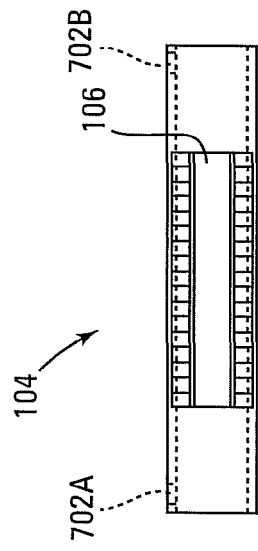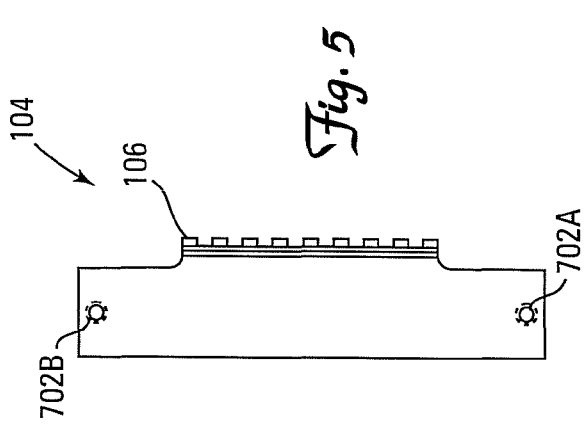

STABILIZING DEVICE MOUNT AND METHOD

CROSS-REFERENCE TO RELATED APPLICATION

This application is a divisional of patent application Ser. No. 11/550,127 filed Oct. 17, 2006 now U.S. Pat. No. 7,594,352, and titled Device Mount with Stabilizing Function.

BACKGROUND

For game hunters the ability to record the hunt in an efficient manner is desired. Moreover, the ability to attach other devices such as rangefinders and other electronic device to the weapon in a manner that does not impede the hunt is also desired. For the reasons stated above and for other reasons stated below which will become apparent to those skilled in the art upon reading and understanding the present specification, there is a need in the art for a mount that can attach a device such an electronic device to a weapon in an effective and un-intrusive manner and provide stabilizing functions to aid the function of the devices.

SUMMARY

The above-mentioned problems of current systems are addressed by embodiments of the present invention and will be understood by reading and studying the following specification. The following summaries are provided as way of examples and not by way of limitation. Moreover, the summaries may include more or less elements than are in the claims and are merely provided to give the reader a basic understanding of some of the elements of the present invention.

In one embodiment, a device mount is provided. The device mount includes a device bracket, a stabilizing tube and at least one stabilizing member. The device bracket has a support plate and a side plate that extends generally at a right angle from the support plate. The stabilizing tube is movably coupled to the side plate. The at least one stabilizing member is received in the stabilizing tube. Moreover, the at least one stabilizing member is configured to stabilize motion of the device bracket.

In another embodiment, another device mount is provided. This device mount includes a device bracket, a stabilizing container, at least one stabilizer and a first mounting rail. The device is used to hold a device. The stabilizing container is coupled to the device bracket. The at least one stabilizer is received in the stabilizing container. The stabilizer is configured to stabilize movement of the device bracket. The first mounting rail is coupled to the stabilizing container. The mounting rail is selectively coupled to a scope ring to connect the device mount to a weapon.

In yet another embodiment, a device mount is provided. The device mount includes a device bracket, a stabilizing tube, a first and second spring and a first and second cap. The device bracket includes a support plate, a side plate and a bias portion. The support plate is configured to hold a device thereto. The side plate has a first end that extends from an end of the support plate at a given angle. The bias portion of the device bracket extends from a second end of the side plate. The stabilizing tube has a receiving aperture configured to slidably receive the bias portion of the device bracket. The first and second springs are received in the stabilizing tube in such a manner that the bias portion of the device bracket is positioned between the first and second springs. The first cap is used to retain the first spring in the stabilizing tube and the second cap is used to retain the second spring in the stabilizing tube.

In finally another embodiment, a method of using a device mount for a weapon is provided. The method comprises coupling a first mounting rail attached to a stabilizing container to a weapon, the stabilizer containing one or more stabilizers and coupling a first device to a device bracket that is movably coupled to the stabilizing container. The functional integrity of the device is maintained by the one or more stabilizers in the stabilizing container during a discharge of the weapon.

BRIEF DESCRIPTION OF THE DRAWINGS

The present invention can be more easily understood and further advantages and uses thereof more readily apparent, when considered in view of the detailed description and the following figures in which:

FIG. 5 is a top view of a stabilizing tube of one embodiment of the present invention;

FIG. 6 is an end view of the stabilizing tube of FIG. 5;

FIG. 7 is a side view of the stabilizing tube of FIG. 5;

FIG. 8 is a side view of a spring cap of one embodiment of the present invention;

FIG. 9 is a end view of the spring cap of FIG. 8;

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention.

The following detailed description is, therefore, not to be taken in a limiting sense, and the scope of the present invention is defined only by the claims and equivalents thereof.

Embodiments of the present invention provide a device mount with stabilization features that help devices coupled to the device mount function properly. In embodiments of the present invention, a stabilizing member such as a pair of springs is used to dampen the effects of a sudden movement of a hunting weapon. Such movement may arise because of recoil produced in response to the firing of a rifle or shotgun or the movement in response to the release of an arrow from a bow or crossbow. Embodiments of the present invention maintain the functional integrity of devices mounted to the device mount during such movements.

Figure 2:
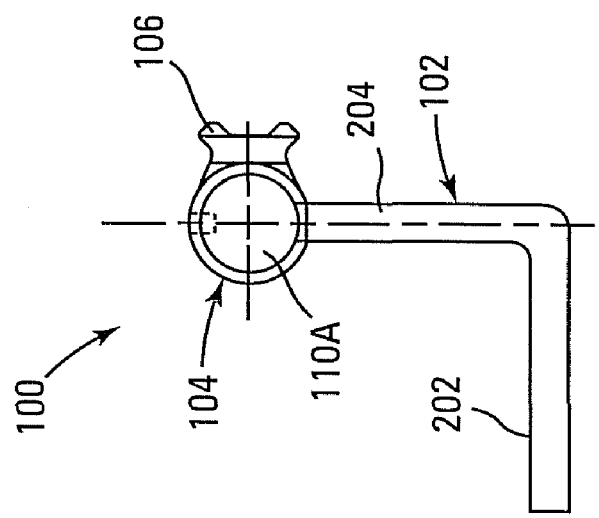
FIG. 2 is a side view of the device mount of FIG. 1.
Figure 1:
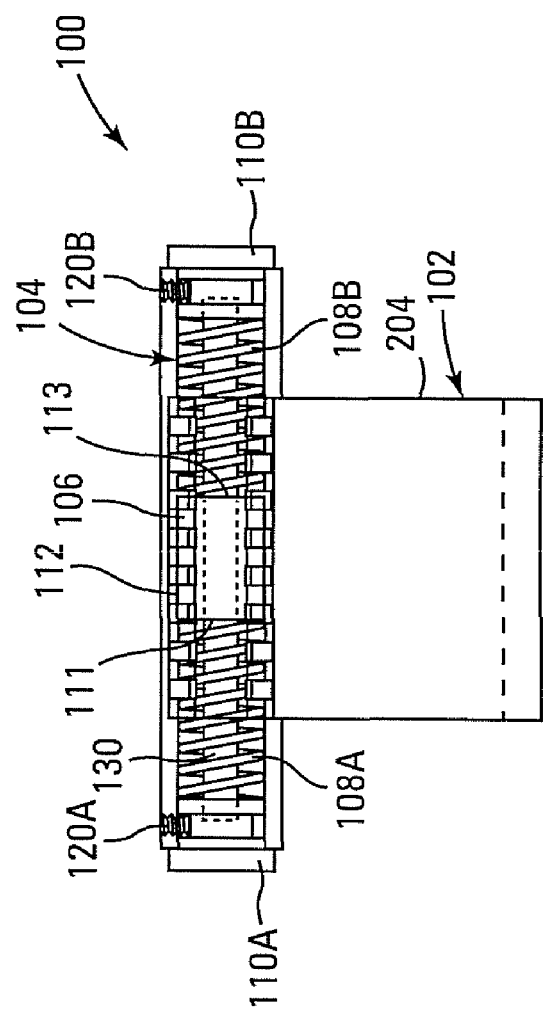
FIG. 1 is a cut away back view of a device mount of one embodiment of the present invention.

FIG. 1 illustrates a cut away back view of a device mount 100 of one embodiment of the present invention. As illustrated, the device mount 100 includes a stabilizing container or tube 104 and a device bracket or mount 102. The stabilizing container 104 is a stabilizing tube 104 in the embodiment of FIG. 1. In other embodiments other shapes are used for the stabilizing container 104. In the stabilizing tube 104, a pair of stabilizing members or pair of springs 108A and 108B are received. In the embodiment illustrated in FIG. 1, the stabilizing members 108A and 108B are a pair of springs 108A and 108B. In other embodiments, other types of stabilizing members are used. As illustrated in FIG. 1, spring 108A is positioned between cap or spring cap 110A and a first engaging surface 111 of a bias portion 112 of the device bracket 102. Spring 108B is positioned between cap or spring cap 110B and a second engaging surface 113 of the bias portion 112 of the device bracket 102. Also included in this embodiment is a holding rod 130. The holding rod 130 holds the springs 108A and 108B in place. Also illustrated in FIG. 1 is a mounting rail 106. The mounting rail 106 selectively engages a scope ring (not shown) which attaches the mount to a weapon such as a rifle, shotgun, bow, crossbow and the like. In one embodiment, the mounting rail is commercially available rail, such as a weaver mounting rail known in the industry. FIG. 2, illustrates a side view of the device mount 100 that includes the stabilizing tube 104 and the device bracket 102. As this view illustrates, the device bracket 102 includes a support plate 202 that extends from the side plate 204. In this embodiment, the support plate 202 extends generally at a right angle from the side plate 204. The support plate 202 is designed to engage a device such as a video camera, rangefinder, game caller and the like.

Figure 3:
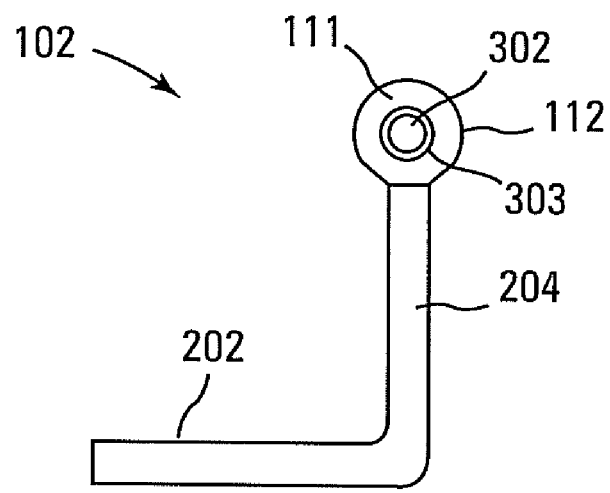
FIG. 3 is a side view of a device bracket of one embodiment of the present invention.
Figure 4:
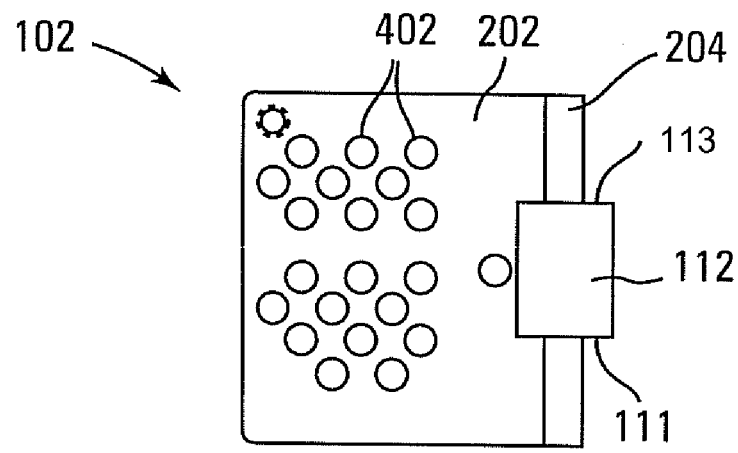
FIG. 4 is a top view of the device bracket of FIG. 3.

Referring to FIG. 3, a side view of a device bracket 102 of one embodiment of the present invention is illustrated. As illustrated the device bracket 102 includes the support plate 202, the side plate 204 and the bias portion 112. The bias portion 112 is received in the stabilizing tube 104 as illustrated in FIG. 1. As illustrated, the bias portion 112 includes a rod aperture 302. The holding rod 130 is received in the rod aperture 302. Moreover, in the embodiment of FIG. 3, a brass sleeve or friction reducing sleeve 303 lines the rod aperture 302 to reduce friction between the holding rod 103 and the rod aperture 302. Hence in this embodiment, the friction reducing sleeve 303 allows the holding rod 130 to slide through the rod aperture 302 in a relatively smooth manner. FIG. 4 illustrates a top view of the device bracket 102. As illustrated, the bias portion 112 includes a first and second engaging surfaces 111 and 113 respectfully. The engaging surfaces 111 and 113 are designed to engage an end of a respective spring 108A and 108B as illustrated in FIG. 1. FIG. 4 also illustrates a plurality of attaching apertures 402 that extend through the support plate 202. The attaching apertures or mounting apertures 402 are used to attach a device to the device mount 100.

FIG. 5 is a top view of a stabilizing tube 104 of one embodiment of the present invention. As illustrated, a mounting rail 106 is attached to the stabilizing tube 104. As discussed above, the mounting rail 106 is used to connect the device mount 100 to a weapon via scope ring. Also illustrated in this view is a pair of engaging apertures 702A and 702B. The engaging apertures 702A and 702B are used to secure a respective cap 110A and 110B in place as illustrated in FIG. 1. In particular, a holding member 120A or 120B is passed through the respective engaging aperture 702A or 702B to hold the respective spring cap 110A and 110B in place. In one embodiment, the engaging apertures 702A and 702B are internally threaded and the holding members 120A and 120B are externally threaded set screws. The external threads on the set screws in this embodiment are designed to engage the internal threads of the engaging apertures 702A and 702B.

An end view of the stabilizing tube 104 is illustrated in FIG. 6. As illustrated, the stabilizing tube 104 has the mounting rail 106. Also illustrated in FIG. 6, is a receiving aperture 602. The receiving aperture 602 is designed to receive the bias portion 112 of the device bracket 102 as illustrated in FIG. 1. FIG. 7 is a side view of the stabilizing tube 104 illustrating the mounting rail 106 as well as the engaging apertures 702A and 702B.

Referring to FIG. 8, a side view of a cap 110 of one embodiment of the present invention is provided. Cap 110 is either cap 110A or 110B of FIG. 1. The cap 110 includes an engaging end 802 that is designed to engage an end of a stabilizing member 108A or 108B as illustrated in relating to 110A and 110B of FIG. 1. The cap 110 further includes an engaging recess 806. The engaging recess 806 is designed to receive a respective holding member 120A and 120B to lock the cap 110 in place as illustrated in FIG. 1. The cap 110 further has an end portion 804 that is illustrated in FIG. 9.

Figure 10:
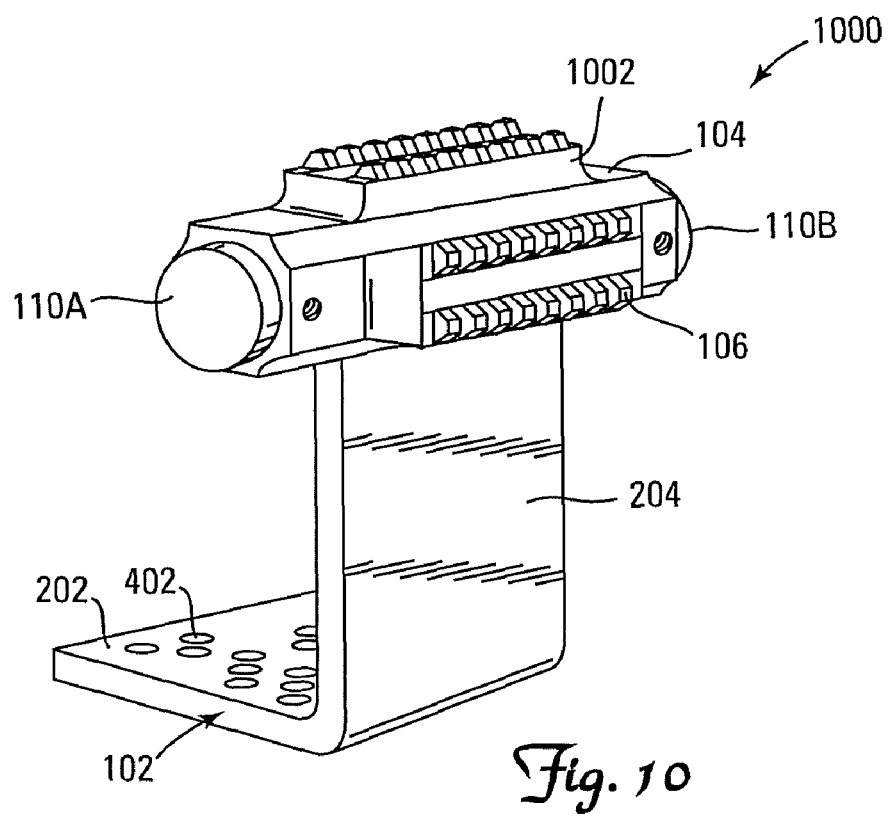
FIG. 10 is a side perspective view of another embodiment of a device mount of the present invention.
Figure 11:
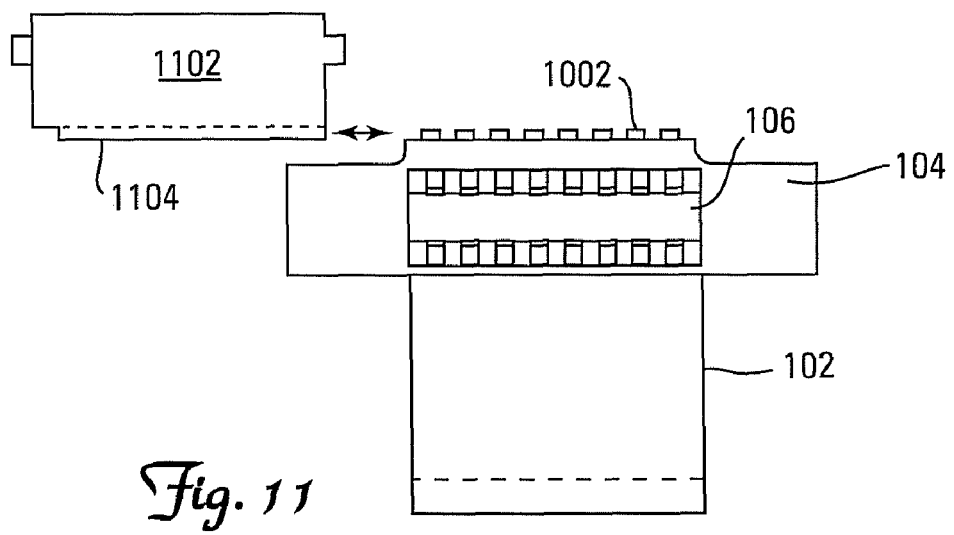
FIG. 11 is a side view of a laser designator being mounted to a second mounting rail of a device mount of one embodiment of the present invention.
Figure 12:
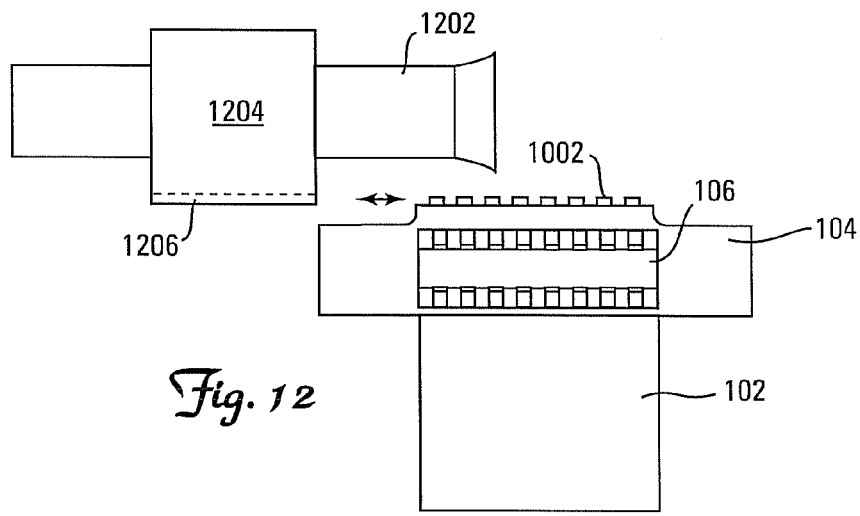
FIG. 12 is a side view of a flashlight being mounted to a second mounting rail of a device mount of one embodiment of the present invention.
Figure 13:
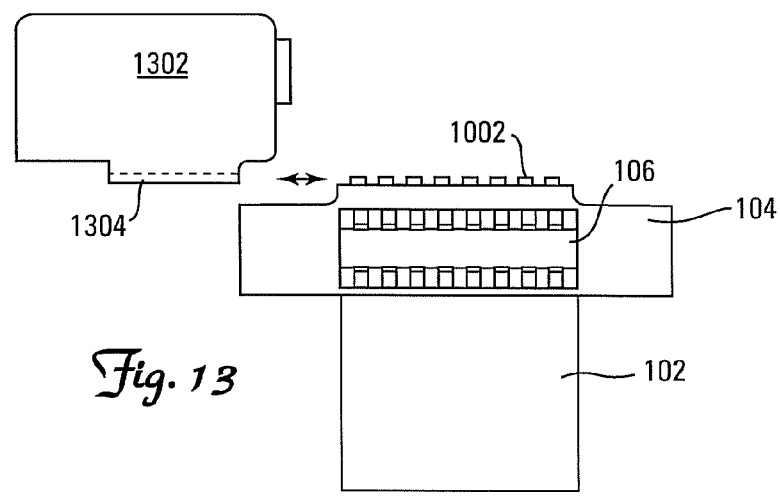
FIG. 13 is a side view of a rangefinder being mounted to a second mounting rail of a device mount of one embodiment of the present invention.
Figure 14:
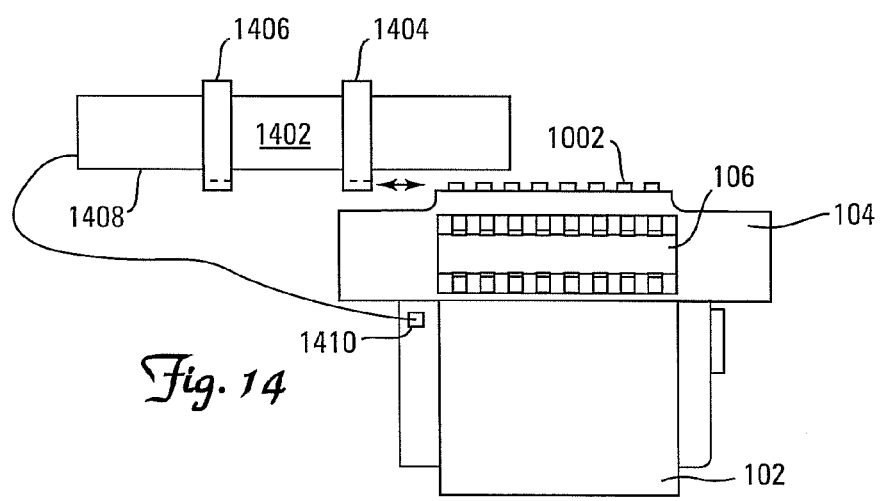
FIG. 14 is a side view of a lipstick camera being mounted to a second mounting rail of a device mount of one embodiment of the present invention.

FIG. 10 illustrates another embodiment of a device mount 1000 with a stabilizing feature of the present invention. This embodiment includes two mounting rails 106 and 1002. Mounting rail 106 is used as discussed above to couple the mounting rail to a hunting weapon. The second mounting rail 1002 is used to attach a second device to the mount. Hence, with this embodiment of the device mount 1000, two devices can be mounted to the weapon, one on the support plate 202 and one on the second mounting rail 1002. As example of a device being mounted on the second mounting rail 1002 is illustrated in FIG. 11. In FIG. 11, the device is a laser designator 1102. A laser designator 1102 projects a laser beam to a target. As illustrated, the laser designator 1102 includes a receiving mounting track 1104 that is designed to selectively engage the second mounting rail 1002. Another example of a device is a flashlight 1202. The flash light is attached to the device mount 102 via device connector 1204 that includes a receiving mounting track 1206 that selectively engages the second mounting rail 1002. In still another embodiment, the device is a rangefinder 1302 that includes a receiving mounting track 1304 that selectively engages the second mounting rail 1002 of the device mount 102. This is illustrated in FIG. 13. In yet another example illustrated in FIG. 14, a lipstick camera 1402 is coupled to the second mounting rail 1002 via a pair of scope mount rings 1406 and 1404.

Figure 15:
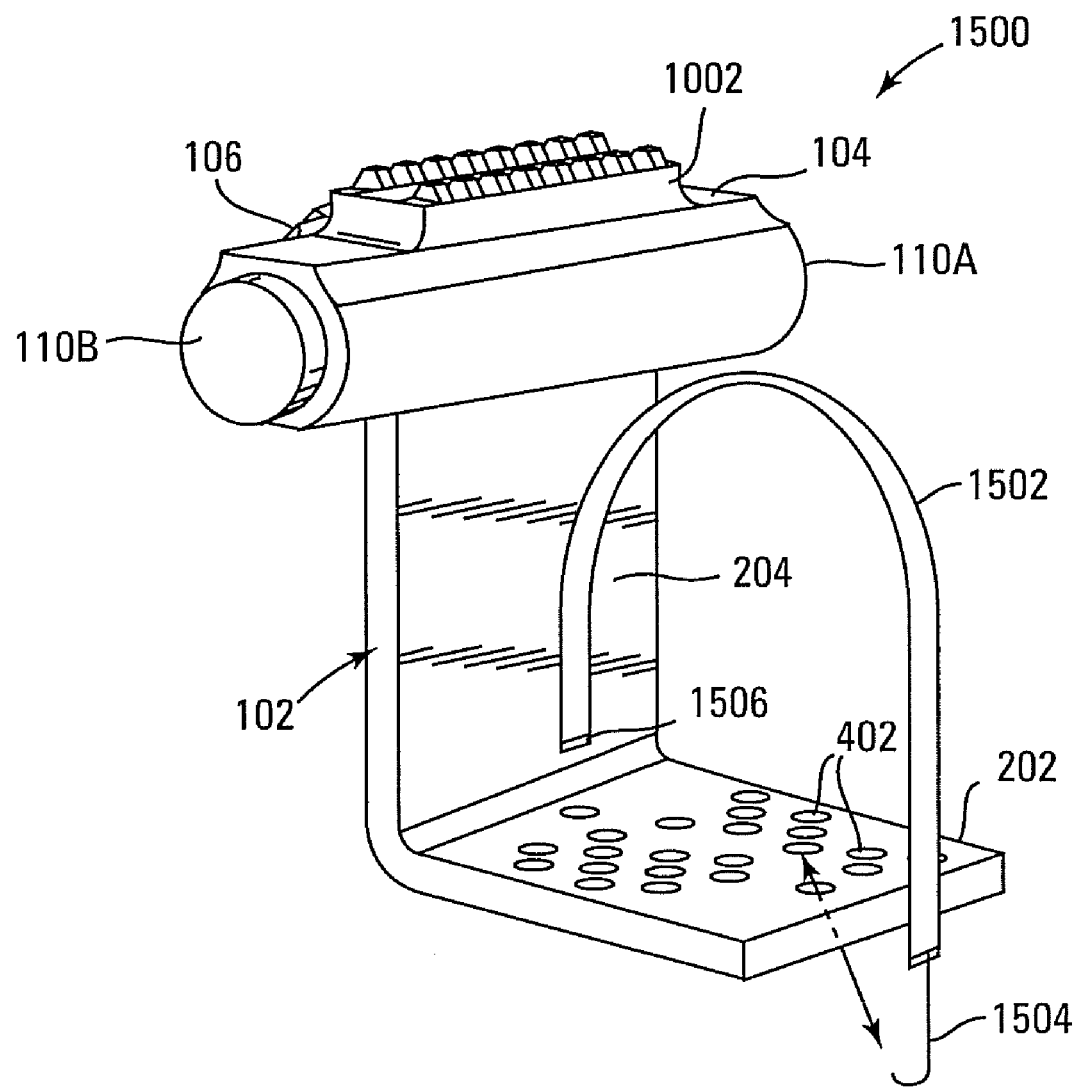
FIG. 15 is a side perspective view of yet another embodiment of a device mount of the present invention.
Figure 16:
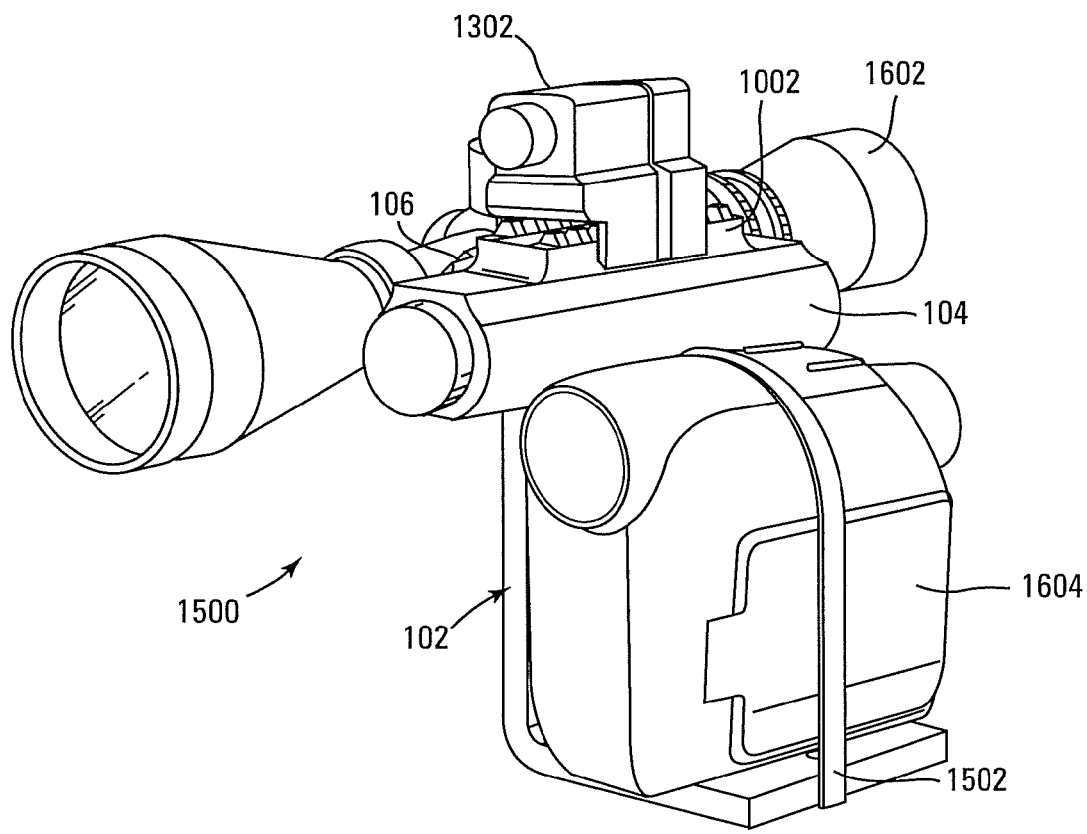
FIG. 16 is a side perspective view of a device mount of one embodiment of the present having two device mounted thereto.

Referring to FIG. 15, another device mount 1500 of another embodiment is illustrated. In this embodiment, two mounting rails 106 and 1002 are provided on the stabilizer container 104. Moreover, in his embodiment, a stabilizing strap 1502 is used. The stabilizing strap 1502 is designed to stabilize a device on the support plate 202 of the device mount device 1500. In one embodiment, the stabilizing strap 1502 is made from an elastic material. In the embodiment of FIG. 15, a first end 1506 of the stabilizing strap 1502 is coupled to the side plate 204. In other embodiments, the first end 1506 of the stabilizing strap 1502 is coupled to support plate 202 (not shown). A second end of the stabilizing strap 1502 includes a hook 1504 that is designed to be selectively positioned in one of the mounting apertures 402 in the support plate 202 of the mount device 1500 to stabilize the device. FIG. 16, illustrates a stabilizing strap 1502 stabilizing a device 1604 to the device mount 1500. FIG. 16 also illustrates, two devices 1604 and 1302 mounted to device mount 1500 as well as the device mount 1500 being coupled to a scope 1602 of a weapon. The device mount 1500 is coupled to scope 1602 via the first mounting rail 106 and one or scope rings. The second device 1302, a laser designator 1302, is coupled to the second mounting rail 1002. In embodiments of the present invention, the device mount 1500 can be mounted on the right or left side of the weapon or scope 1602 as illustrated.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A device mount for mounting a device to a weapon scope, the device mount comprising:
    a device support for supporting the device thereon;
    a stabilizing system attached to the device support, the stabilizing system for dampening movement of the device support, the stabilizing system having a stabilizing tube container attached to the device support, and at least one stabilizing spring member received in the stabilizing tube container, the stabilizing tube container having at least one cap, a portion of the cap received in the stabilizing tube container, wherein the at least one cap holds the at least one stabilizing spring member in place; and a mounting system attached to the stabilizing system, the mounting system for attaching the device support to the weapon scope.

2. The device mount of claim 1, wherein the device support further comprises:
    a support portion for supporting the device thereon; and
    a side portion having a first end extending from the support portion at generally a right angle.

3. The device mount of claim 2, wherein the device support further comprises:
    a bias portion extending from a second end of the side portion, the bias portion slidably received into the stabilizing system.

4. The device mount of claim 2, wherein the device support further comprises:
    a support strap removably attached to the support portion for securing the device thereto.

5. The device mount of claim 1, wherein the mounting system further comprises:
    a first mounting rail attached to the stabilizing system for attaching the device support to the weapon scope.

6. The device mount of claim 5, further comprising:
    a second mounting rail for receiving a device mounting track.

* * * * *